United States Patent
Jang et al.

(10) Patent No.: US 9,998,317 B2
(45) Date of Patent: Jun. 12, 2018

(54) METHOD OF DETECTING SYNCHRONIZATION SIGNAL IN WIRELESS COMMUNICATION SYSTEM

(71) Applicant: Samsung Electronics Co., Ltd., Gyeonggi-do (KR)

(72) Inventors: Seong-Hyun Jang, Seoul (KR); Niranjan Nayak Ratnakar, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/180,943

(22) Filed: Jun. 13, 2016

(65) Prior Publication Data

US 2016/0365972 A1 Dec. 15, 2016

Related U.S. Application Data

(60) Provisional application No. 62/174,315, filed on Jun. 11, 2015.

(30) Foreign Application Priority Data

Sep. 25, 2015 (KR) ........................ 10-2015-0136244

(51) Int. Cl.
*H04L 7/04* (2006.01)
*H04L 27/26* (2006.01)
*H04J 11/00* (2006.01)

(52) U.S. Cl.
CPC ....... *H04L 27/2656* (2013.01); *H04J 11/0069* (2013.01); *H04J 11/0076* (2013.01); *H04L 27/2613* (2013.01)

(58) Field of Classification Search
CPC ........................ H04L 27/2613; H04L 27/2656
See application file for complete search history.

(56) References Cited

U.S. PATENT DOCUMENTS

| 8,687,741 | B1* | 4/2014 | Erell | ..................... H04W 56/00 375/340 |
| 2011/0306341 | A1 | 12/2011 | Klein et al. | |
| 2013/0273912 | A1 | 10/2013 | Xu et al. | |

(Continued)

*Primary Examiner* — Ross Varndell
(74) *Attorney, Agent, or Firm* — The Farrell Law Firm, P.C.

(57) ABSTRACT

A method, communication device, and user equipment (UE) for detecting a synchronization signal in a wireless communication system are provided. The method includes receiving a synchronization signal including a code sequence of length 2N, wherein the code sequence includes an even code sequence of length N and an odd code sequence of length N; obtaining the code sequence by de-scrambling the received synchronization signal; generating and storing a correlation value of the even code sequence by full-correlating the even code sequence with a number of candidate even code sequences; generating a correlation value of the odd code sequence by full-correlating the odd code sequence with a number of candidate odd code sequences, and obtaining a correlation value of the code sequence by adding the stored correlation value of the even code sequence corresponding to the candidate odd code sequences to the generated correlation value of the odd code sequence; and detecting the synchronization signal based on the obtained correlation value of the code sequence.

20 Claims, 5 Drawing Sheets

(56) References Cited

U.S. PATENT DOCUMENTS

2014/0022988 A1\* 1/2014 Davydov ............... H04B 7/024
370/328
2014/0126568 A1\* 5/2014 Berggren .......... H04W 56/0015
370/350

\* cited by examiner

METHOD OF DETECTING SYNCHRONIZATION SIGNAL IN WIRELESS COMMUNICATION SYSTEM

PRIORITY

This application claims priority under 35 U.S.C. § 119(e) to a U.S. Provisional Patent Application filed on Jun. 11, 2015 in the U.S. Patent and Trademark Office and assigned Ser. No. 62/174,315 and under 35 U.S.C. § 119(a) to a Korean Patent Application filed on Sep. 25, 2015 in the Korean Intellectual Property Office and assigned Ser. No. 10-2015-0136244, the entire contents of each of which are incorporated herein by reference.

BACKGROUND

1. Field of the Disclosure

The present disclosure relates generally to a method of optimizing a correlation operation when a secondary synchronization signal of a modem included in a user equipment (UE) in a cellular communication system such as a long term evolution (LTE) or an LTE-Advanced (LTE-A) is detected, and more particularly, to a method of reducing a handover time and a connection time of a UE, by reducing a time of a cell search of the UE.

2. Description of the Related Art

In a cellular communication system, a UE is connected or attached to a cell (which is controlled by a base station) on a network, and thus the UE may communicate with a base station of the network or another UE. A procedure for connecting a UE with a cell may include a cell search operation and an operation of obtaining cell system information.

A cell search operation of a UE is an operation of searching for a synchronization signal that is transmitted from a cell in a network to obtain synchronization. Specifically, a cell search operation of a UE includes an operation of detecting a primary synchronization signal (PSS) and a secondary synchronization signal (SSS) transmitted from a cell.

If the time of a cell search operation of a UE is increased, a time taken to connect a UE to a cell is increased. In addition, an increase in the time of a cell search operation causes an increase in the time of a handover of the UE.

SUMMARY

An aspect of the present disclosure provides a method of reducing a handover time and a connection time of a UE, by reducing a time of a cell search of the UE.

Another aspect of the present disclosure provides a method of reducing a time to detect a synchronization signal (e.g., PSS or SSS) by a UE.

Another aspect of the present disclosure provides a method of reducing an operation time by reducing an operation amount of a full correlation operation of a code sequence used in a synchronization signal detection.

Another aspect of the present present disclosure provides a method of dividing a full correlation of a code sequence into an odd code sequence and an even code sequence.

Another aspect of the present disclosure provides a low complexity UE that can detect a synchronization signal without a loss of performance, where the UE may calculate a full correlation value of a code sequence in a low number of calculations.

Another aspect of the present disclosure provides a method of reducing a time required in a cell search in a system such as LTE.

Another aspect of the present disclosure provides a method of reducing PSS and SSS detection time and thus reducing a time required in a connection from a UE modem to a base station.

Another aspect of the present disclosure provides a method of reducing a possibility of a call drop generation and a time required in a handover.

Another aspect of the present disclosure provides a UE that may search more base stations per a unit time, where a time required for a connection from a UE to a base station may be reduced, and where power consumption may be reduced.

In accordance with an aspect of the present disclosure, a method of detecting a synchronization signal of a UE in a wireless communication system is provided. The method includes receiving a synchronization signal including a code sequence of length 2N, wherein the code sequence includes an even code sequence of length N and an odd code sequence of length N; obtaining the code sequence by de-scrambling the received synchronization signal; generating and storing a correlation value of the even code sequence by full-correlating the even code sequence with a number of candidate even code sequences; generating a correlation value of the odd code sequence by full-correlating the odd code sequence with a number of candidate odd code sequences, and obtaining a correlation value of the code sequence by adding the stored correlation value of the even code sequence corresponding to the candidate odd code sequences to the generated correlation value of the odd code sequence; and detecting the synchronization signal based on the obtained correlation value of the code sequence.

In accordance with another aspect of the present disclosure, a communication device for detecting a synchronization signal in a wireless communication system is provided. The communication device includes a transceiver configured to receive a synchronization signal including a code sequence of length 2N, wherein the code sequence includes an even code sequence of length N and an odd code sequence of length N; and a processor configured to obtain the code sequence by de-scrambling the received synchronization signal, generate and store a correlation value by full-correlating the even code sequence with a number of candidate even code sequences, generate a correlation value by full-correlating the odd code sequence with a number of candidate odd code sequences, obtain a correlation value of the code sequence by adding the stored correlation value of the even code sequence corresponding to the candidate odd code sequences to the generated correlation value of the odd code sequence, and detect the synchronization signal based on the obtained correlation value of the code sequence.

In accordance with another aspect of the present disclosure, a UE for detecting a synchronization signal in a wireless communication system is provided. The UE includes a communication device configured to receive a synchronization signal including a code sequence of length 2N, wherein the code sequence includes an even code sequence of length N and an odd code sequence of length N, obtain the code sequence by de-scrambling the received synchronization signal, generate and store a correlation value by full-correlating the even code sequence with a number of candidate even code sequences, generate a correlation value by full-correlating the odd code sequence with a number of candidate odd code sequences, obtain a correlation value of the code sequence by adding the stored correlation value of the even code sequence corresponding to the candidate odd code sequences to the generated correlation value of the odd code sequence, and detect the synchronization signal based on the obtained correlation value of the code sequence, a display connected to the communication device; and an input/output interface connected to the communication device.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF THE PRESENT DISCLOSURE

Hereinafter, the present disclosure is described in detail with reference to the accompanying drawings. In the following description of the present disclosure, a detailed description of known configurations or functions incorporated herein are omitted when the detailed description may make the subject matter of the present disclosure unclear. The terms as described below are defined in consideration of the functions in the aspects, and the meaning of the terms may vary according to the intention of a user or operator, convention, or the like. Therefore, the definition of a term should be determined based on the overall contents of the present disclosure.

In the detailed description of the present disclosure, an example of interpretable meanings of some terms used in the present disclosure is provided. However, it is noted that the terms are not limited to the examples of the construable meanings which are set forth below.

A base station is a main body communicating with a UE, and may be referred to as a base station (BS), a Node B (NB), an eNode B (eNB), an access point and the like.

A UE is a subject communicating with a BS, and may be referred to as a mobile station (MS), a mobile equipment (ME), a device, a terminal and the like.

Figure 1:
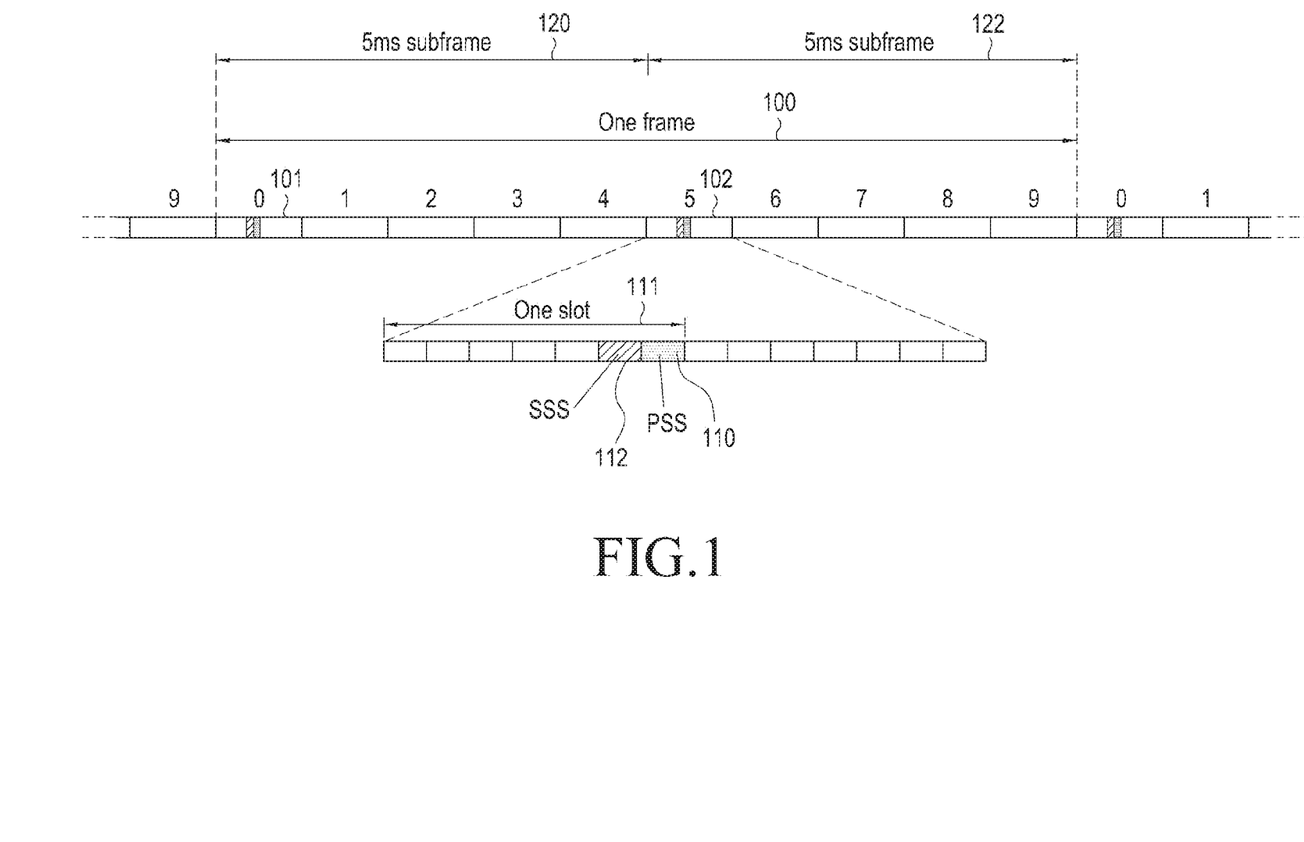
FIG. 1 is an illustration of a PSS and an SSS being transmitted in an LTE communication system based on frequency division duplexing (FDD) in a time domain.

FIG. 1 is an illustration of a PSS and an SSS being transmitted in an LTE communication system based on FDD in a time domain.

Referring to FIG. 1, in one frame 100 (e.g., 10 ms), a PSS and an SSS may be transmitted twice. For example, FIG. 1 shows that a PSS and an SSS are transmitted in a subframe 0 101 and a subframe 5 102. One subframe (e.g., 1 ms) may include two slots (e.g., 0.5 ms), and one slot may include 7 symbols. With respect to the subframe 5 102 as an example, a PSS may be transmitted in a last symbol 110 of a first slot 111, and an SSS may be transmitted in a next to last symbol 112 (i.e., a second to last symbol) of the first slot 111.

A physical-layer cell identity (PCID) of a cell in an LTE system may have one of 504 values. A PSS may have one of three values (i.e., 0, 1 and 2) according to a PCID of a cell. In addition, an SSS may have one of 168 values (i.e., 0 to 167) in order to indicate 168 physical-layer cell identify groups. Therefore, a UE identifying a PSS corresponding to one of three values identifies an SSS corresponding to one of 168 values, and thus a UE identifies a PCID of a cell among one of 504 (i.e., 168*3) values of PCIDs.

A value of a PSS transmitted through a first 5 ms unit of a subframe (hereinafter, referred to as "5 ms subframe") 120 is equal to that of a PSS transmitted through a second 5 ms subframe 122. However, a value of an SSS transmitted through the first 5 ms subframe 120 is not equal to that of an SSS transmitted through the second 5 ms subframe 122. The two SSSs are different to enable a frame timing synchronization by enabling the UE to identify a 5 ms subframe (i.e., the first 5 ms subframe or second 5 ms subframe) through which an SSS is transmitted.

In the present disclosure, a first 5 ms subframe is referred to as an even 5 ms subframe or an even subframe, and the second 5 ms subframe is referred to as an odd 5 ms subframe or an odd subframe.

A code sequence of length 62 is transmitted through an SSS. As described above, an SSS may have one of 168 values. Therefore, an operation of detecting an SSS by a UE is determining a value to which the code sequence of length 62 corresponds among 168 values.

Specifically, a UE full-correlates a code sequence of length 62 received in an SSS with each of 336 different candidate code sequences, determines a candidate code sequence indicating the largest correlation in 336 results as a code sequence of the SSS, and determines a value corresponding to the determined code sequence as a cell ID group. In this case, full correlation indicates an operation of adding N products of multiplying a reception code sequence of which the length is N and a candidate code sequence of which the length is N sample by sample (i.e., a symbol by symbol forming each sequence) when the length of the code sequence is N.

The number of the candidate code sequences is 336 rather than 168, because an SSS of an even 5 ms subframe is not identical to an SSS of an odd 5 ms subframe. That is, a received SSS may have one of 336 (i.e., 168*2) values. Therefore, an SSS detected through full correlation of 336 candidate code sequences identifies a cell ID group to which a PCID is included among 168 cell ID groups as well as an even or odd 5 ms subframe to which an SSS is included.

Figure 2:
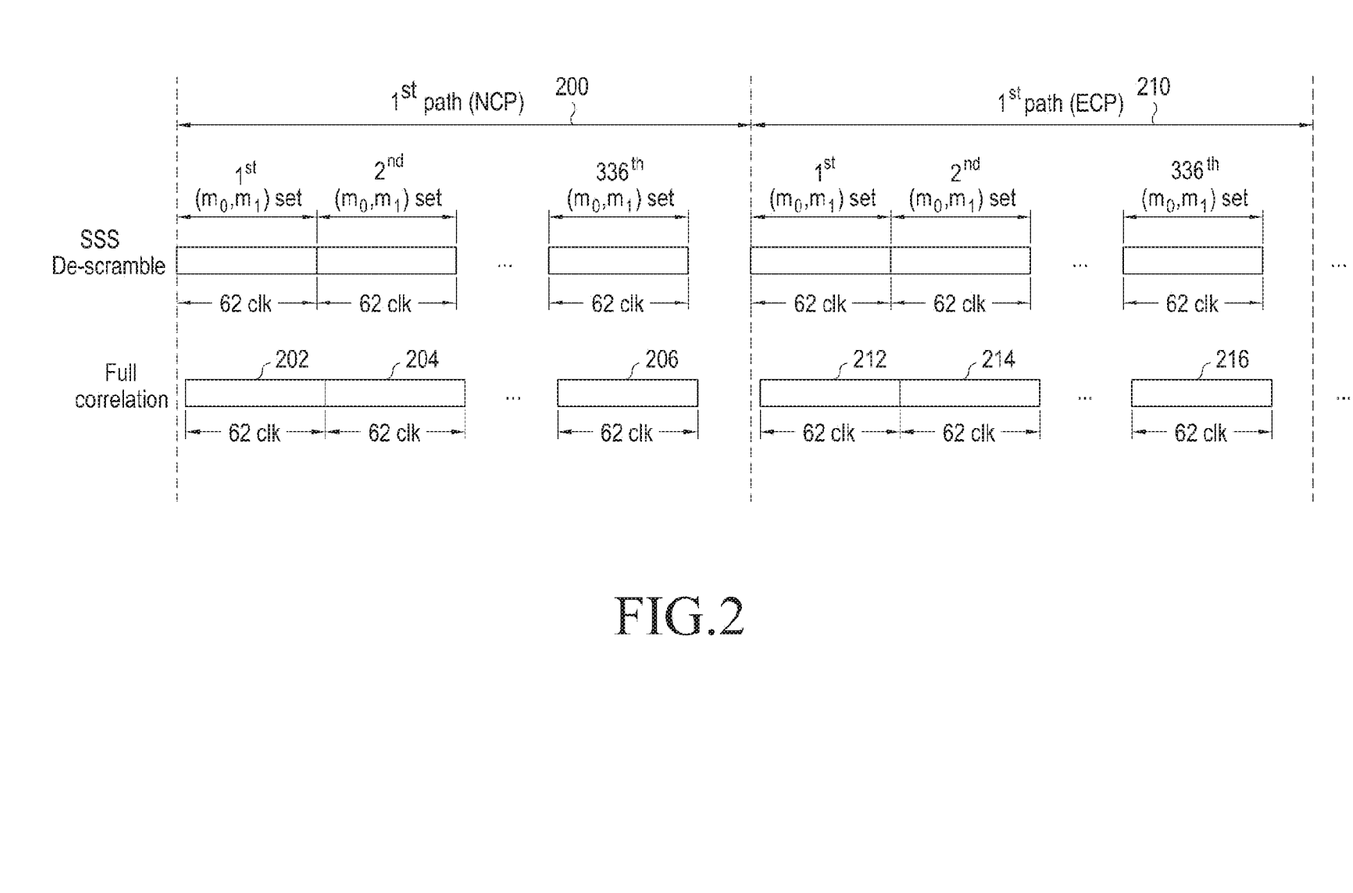
FIG. 2 is an illustration of calculation operation in a User Equipment (UE) detecting an SSS for a cell search in an LTE system.

FIG. 2 is an illustration of calculation operation in a UE detecting an SSS for the cell search in an LTE system.

Referring to FIG. 2, the UE detects the SSS (i.e., a code sequence of length 62) for 36 paths with respect to each of a normal cyclic prefix (NCP) and an extended cyclic prefix (ECP) in a cell search process. The code sequence which is to be detected by the UE is generated using two indices $m_0$ and $m_1$ and thus the code sequence may be expressed as a set $(m_0, m_1)$ of an index.

For example, with respect to a first path 200 of the NCP, the UE de-scrambles a reception SSS to obtain a code sequence of length 62, and full-correlates the obtained code sequence with each of 336 candidate code sequences 202, 204 and 206. Then, with respect to a first path of the ECP, the UE may de-scrambles the reception SSS to obtain the code sequence of length 62, and may full-correlate the obtained code sequence with each of 336 candidate code sequences 212, 214 and 216.

As described above, the UE may detect an SSS for 36 paths of each of the NCP and the ECP. Then, a calculation time of 62 clocks (i.e., clk; a unit calculation time) is required for full-correlating of the code sequence of length 62 with one candidate code sequence by the UE.

Therefore, a time T required to detect an SSS by full-correlating with 336 candidate code sequences by the UE may be expressed in Equation (1) as follows:

$$T=1/f\text{MHz}*(62\text{clk/code}*336\text{code}*36\text{path}*2\text{CP}+4\text{clk}) \quad \text{Equation(1)}$$

For example, when an operation frequency f of a calculation device included in a modem of the UE is 245.76 MHz, the time required to detect an SSS in the method of FIG. 2 is about 6.1 ms.

Since the code sequence of a reception SSS should be full-correlated with 336 candidate code sequences such that a modem of a UE detects the SSS in a time that is 336 times the time required for full-correlating one candidate code sequence. The time required to detect a code sequence of an SSS increases as the number of candidate code sequences increases. If the code sequence detection time increases, a time for a UE to connect to a base station increases, and if a connection to a base station fails, additional time is required to connect to another radio access technology (RAT) (e.g., which is not LTE).

Therefore, an aspect of the present disclosure reduces a time to detect an SSS required in a cell search procedure of a UE including a PSS detection operation and an SSS detection operation. More specifically, the time required for a full correlation operation to detect an SSS is reduced.

If a reception SSS signal having a code sequence of length 62 is Y(k) and a candidate code sequence to be full-correlated with the reception SSS signal is S(k), a result metric (s, n, c) calculated by the full correlation for the SSS detection with respect to one CP may be expressed as in Equation (2) as follows:

$$\text{metric}(s, n, c) = \sum_{k=0}^{61} Y(k) \cdot S^*(k) \quad \text{Equation (2)}$$

where "s" denotes a secondary cell identity (SCID) (i.e., a physical-cell ID group indicated by the SSS), "n" denotes an index of a 5 ms subframe, "c" denotes a CP type (i.e., the NCP or ECP), and "S*(k)" denotes a conjugate of S(k).

The code sequence of length 62 may be generated by a combination of a an even code sequence of length 31 and an odd code sequence of length 31. An odd code sequence may be generated by the indices $m_0$ and $m_1$. In contrast, an even code sequence may be generated by one (e.g., $m_0$) of the indices $m_0$ and $m_1$. The indices $m_0$ and $m_1$ are determined by the PCID, and each of the indices $m_0$ and $m_1$ may be 0 to 30. The number of code sequences generated by the combination of the indices $m_0$ and $m_1$ is 168, and code sequences generated by the same $m_0$ (e.g., an even code sequence) will be the same.

Table 1 below shows 168 physical-cell ID groups $N_{ID}^{(1)}$ generated by the combination of the indices $m_0$ and $m_1$.

TABLE 1

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |

TABLE 1-continued

| $N_{ID}^{(1)}$ | $m_0$ | $m_1$ |
|---|---|---|
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |

Then, since an even code sequence is generated based on only $m_0$ (or only $m_1$), even code sequences generated by the same $m_0$ (or the same $m_1$) will be the same. In an aspect of the present disclosure, an SSS full correlation operation using even code sequence characteristics is processed more simply.

For example, a UE calculates (and stores) a full correlation for an even code sequence of length 31 and adds the calculated the full correlation value of the even code sequence to a full correlation value with a candidate code sequence of the length-31 that is an odd code sequence. Thus, the UE may reduce the length of the full correlation operation with the candidate code sequence from 62 to 31. Therefore, the UE may reduce the time required for an SSS detection as compared to a case in which a full correlation for a code sequence of length 62 is performed.

A metric of Equation (2) above performs a full correlation for an SSS of length 62. If the metric is divided into a full correlation metric metric_even(s,n,c) for an even code sequence and a full correlation metric metric_odd(s,n,c) for an odd code sequence, the metric may be expressed as in Equation (3) as follows:

$$\text{metric}(s, n, c) = \text{metric\_even}(s, n, c) + \text{metric\_odd}(s, n, c) \quad \text{Equation (3)}$$

$$= \sum_{k=0}^{30} (Y(2k) \cdot S^*(2k) + Y(2k+1) \cdot S^*(2k+1))$$

$$= \sum_{k=0}^{30} Y(2k) \cdot S^*(2k) + \sum_{k=0}^{30} Y(2k+1) \cdot S^*(2k+1)$$

In Equation (3) above, an even (i.e., 2k) candidate code sequence and an odd (i.e., 2k+1) candidate code sequence are described in Equation (4) as follows:

$$\text{metric}(s, n, c) = \sum_{k=0}^{30} Y(2k) \cdot \tilde{s}(m_0+k) c_0(k) + \sum_{k=0}^{30} Y(2k+1) \cdot \tilde{s}(m_1+k) c_1(k) z_1^{(m_0)}(k) \quad \text{Equation (4)}$$

In this case, "k" is a number indicating a code symbol forming a code sequence. A code sequence of length 62 may be expressed using "k" having a value of 0 to 30. An even code symbol may be expressed as "(2k)" and an odd code symbol may be expressed as "(2k+1)."

In Equation (4) above, $\tilde{s}(m_0+k)c_0(k)$ indicates the even candidate code sequence (defined in an LTE standard), and $\tilde{s}(m_1+k)c_1(k)z_1^{(m_0)}(k)$ indicates the odd candidate code sequence (defined in the LTE standard). Since the even candidate code sequence is determined by $m_0$, the number of the even candidate code sequences is 31, and the number of the odd candidate code sequence determined by $m_0$ and $m_1$ is 336 (i.e., 168*2).

As shown in Equation (4) above, since the even code sequence $\tilde{s}(m_0+k)c_0(k)$ is affected by only the index $m_0$, the same $m_0$ will generate the same code sequence. When such a characteristic is used, values of an even correlations (i.e., correlations for an even code sequences) using the same $m_0$ among 336 candidate code sequences which is expressed as the set of $(m_0, m_1)$ will be the same.

Figure 3:
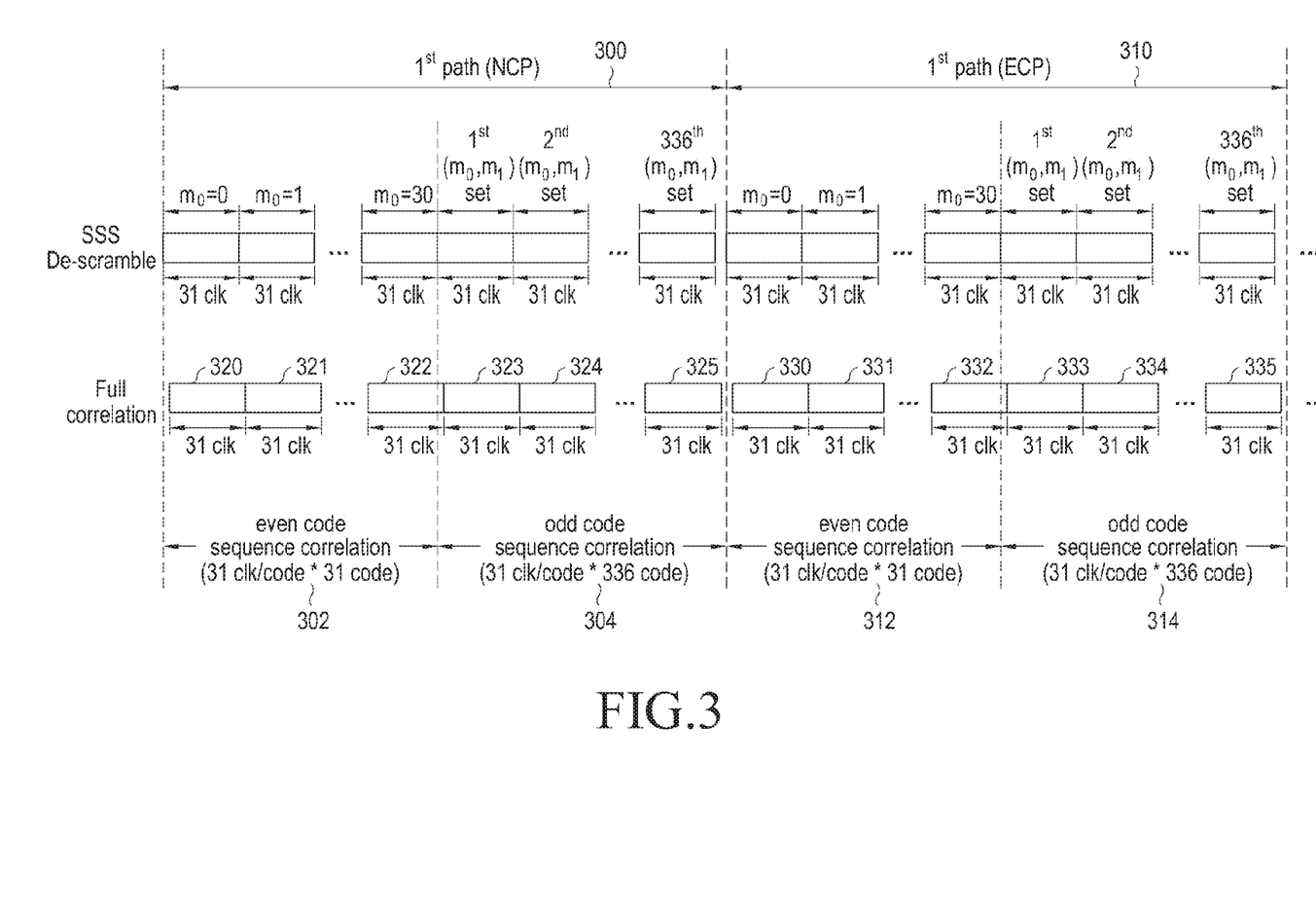
FIG. 3 is an illustration of detecting an SSS for a cell search in an LTE system by a UE according to an aspect of the present disclosure.

FIG. 3 is is an illustration of detecting an SSS for a cell search in an LTE system by a UE according to an aspect of the present disclosure.

Referring to FIG. 3, the UE detects the SSS for 36 paths with respect to each of the NCP and ECP in the cell search process.

For a first path 300 of the NCP, the UE de-scrambles the reception SSS to obtain a code sequence of length 62. Then, the UE performs a full correlation on the even code sequence of length 31 in the obtained code sequence of length 62 with each of 31 even candidate code sequences 320, 321 and 322, which are determined by $m_0$, and stores the correlation value (i.e., $Y(2k)\cdot\tilde{s}(m_0+k)c_0(k)$) 302. The UE performs a full correlation on the odd code sequence of length 31 in the code sequence of length 62 with each of the 336 candidate code sequences 323, 324 and 325, which are determined by the set $(m_0, m_1)$, and calculates the correlation value (i.e., $Y(2k+1)\cdot\tilde{s}(m_1+k)c_1(k)z_1^{(m_0)}(k)$) 304. Then, the UE adds the stored full correlation value of the even code sequence corresponding to $m_0$ to the full correlation value of the odd code sequence, and thus the UE may obtain the full correlation value for the code sequence of length 62. Then, for a first path 310 of the ECP, the UE de-scrambles the reception SSS to obtain the code sequence of length 62. Then, the UE performs a full correlation on the even code sequence of length 31 in the obtained code sequence of length 62 with each of 31 candidate code sequences 330, 331 and 332, which are determined by $m_0$, and stores the correlation value 312. The UE performs a full correlation on the odd code sequence of length 31 in the code sequence of length 62 with each of the 336 candidate code sequences 333, 334 and 335, which are determined by the set $(m_0, m_1)$, and calculates the correlation value 314. Then, the UE adds the stored full correlation value of the even code sequence corresponding to $m_0$ to the full correlation value of the odd code sequence, and thus the UE may obtain the full correlation value for the code sequence of length 62.

As described above, the UE may detect the SSS for 36 paths of each of the NCP and ECP. In this case, since the UE does not full-correlate the code sequence of length 62, but divides the code sequence into an even code sequence and an odd code sequence to perform the full correlation with the candidate code sequence, in one full correlation operation, 31 clock periods (i.e., clk; unit operation time) are required.

Thus, the time (T) required to detect an SSS by full correlation with 336 candidate code sequences may be expressed as in Equation (5) as follows:

$$T=1/f\text{MHz}*(((31\text{clk/code}*31\text{code})+(31\text{clk/code}*336\text{code}))*36\text{path}*2\text{CP}+5\text{clk}) \quad \text{Equation}(5)$$

In Equation (5) above, "(31 clk/code*31 code)" denotes a correlation operation for a even code sequence, and "(31 clk/code*336 code)" denotes a correlation operation for an odd code sequence.

For example, when an operation frequency (f) of an operation device included in a modem of a UE is 245.76 MHz, the time required to detect an SSS in the method illustrated in FIG. 3 is about 3.33 ms.

As described above, if the SSS is detected according to an aspect of the present disclosure, the SSS detection time of the UE is markedly reduced. The reduction of an SSS detection time of a UE indicates a reduction of a cell search time, and thus a UE may reduce a handover time and power consumption of a cell search.

Figure 4:
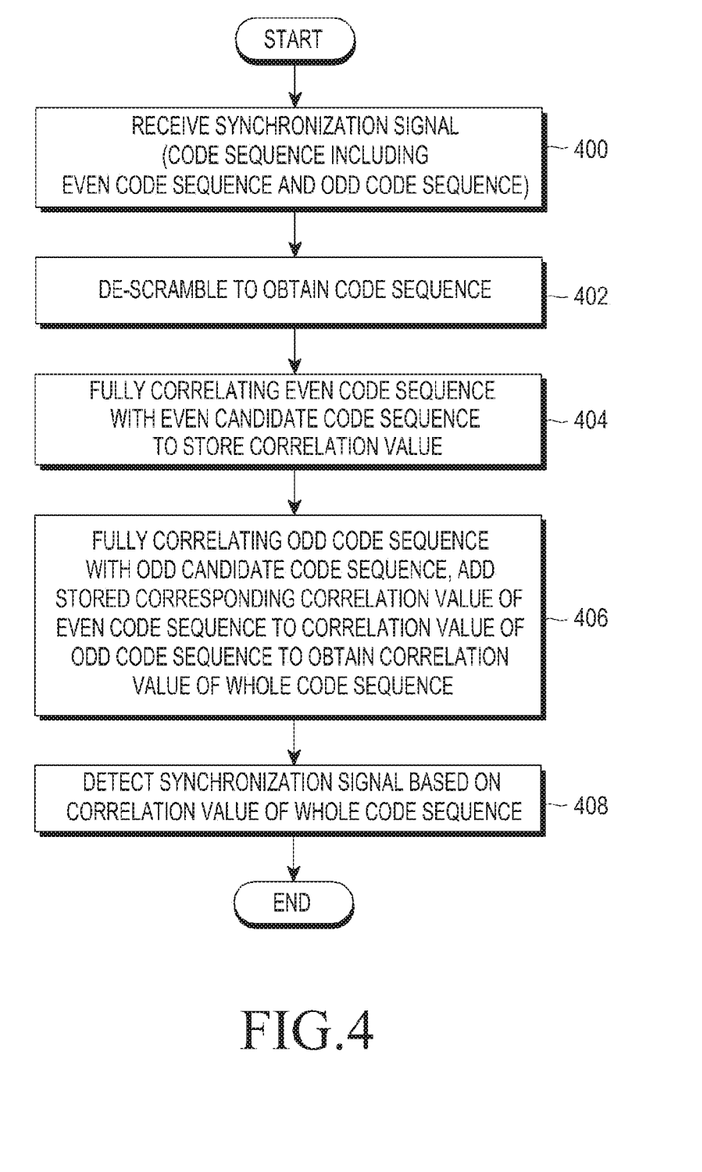
FIG. 4 is a flowchart of a method of detecting a synchronization signal of a UE according to an aspect of the present disclosure.

FIG. 4 is a flowchart of a method of detecting a synchronization signal of a UE according to an aspect of the present disclosure.

Referring to FIG. 4, the UE may receive the synchronization signal transmitted in a certain area of time-frequency transmission resources in step 400. The received synchronization signal may include a code sequence of length 2N, including an even code sequence of length N and an odd code sequence of length N. In this case, N may have a value of 31. The synchronization signal may be an SSS.

The UE may obtain the code sequence by de-scrambling the synchronization signal in step 402.

The UE may perform a full correlation on the even code sequence (e.g., defined by the LTE standard) in the code sequence with the even candidate code sequence to generate a correlation value, and may store the generated correlation value in step 404. The operations of generating and storing the correlation value may be performed for each even candidate code sequence. The number of the even candidate code sequences may be identical to the length N of the even code sequence.

The UE may add a value corresponding to the odd candidate code sequence among the stored correlation values of the even code sequences, while fully correlating the odd code sequence (e.g., defined by the LTE standard) in the code sequence with the odd candidate code sequence to generate the correlation value in step 406. Accordingly, the UE may obtain the correlation value for the full code sequence. The number of the odd candidate code sequences may be determined based on the number of PCID groups of the cell. For example, the number of the odd candidate code sequences may be 336 which is twice 168. In this case, 168 is the number of PCID groups.

The UE may detect the synchronization signal based on the correlation value of the obtained whole code sequence in step 408. For example, the UE may determine a candidate code sequence of which the correlation value of the whole code sequence is the largest code sequence of the SSS. The correlation value of the code sequence may be expressed as a correlation metric for the even code sequence and the correlation metric for the odd code sequence. Alternatively, the UE may further determine a frame timing using the detected synchronization signal.

Figure 5:
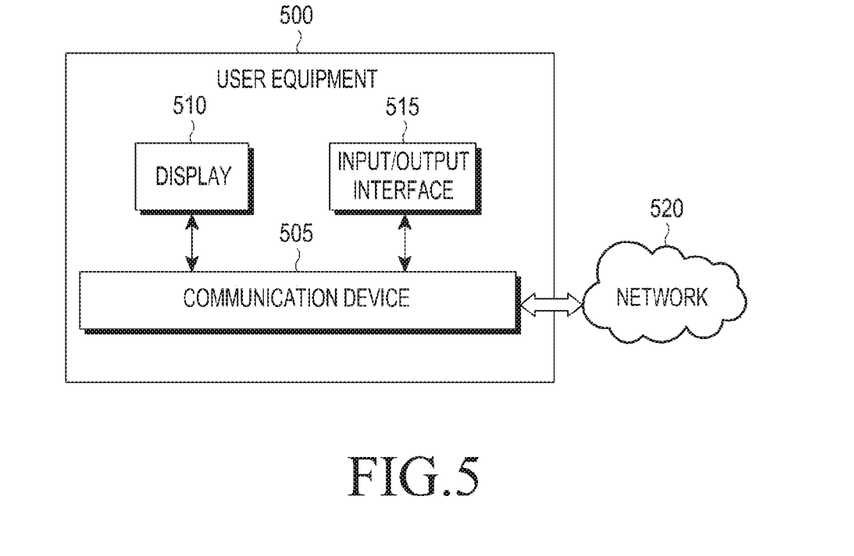
FIG. 5 is a block diagram of a UE in a communication network according to an aspect of the present disclosure.

FIG. 5 is a block diagram of a UE in a communication network according to an aspect of the present disclosure.

Referring to FIG. 5, a UE 500 may include a communication device 505. Alternatively, the UE 500 may further include at least one of a display 510 and an input/output interface 515.

The communication device 500 communicates with another entity (e.g., a base station or a UE) on a network 520. The communication device 505 may be a main object for performing overall operations of the UE 500. The communication device 505 may also be referred to as a modem or a modem chip.

Examples of the display 515 may include a liquid crystal display (LCD), a light-emitting diode (LED) display, an organic LED (OLED) display, a microelectromechanical systems (MEMS) display, and an electronic paper display.

The input/output interface 515 may serve as an interface that may transfer instructions or data, which are input from a user or another external device to other component(s) of the UE 500. Further, the input/output interface 515 may output instructions or data received from other component(s) of the UE 500 to a user or an external device.

According to an aspect of the present disclosure, the UE 500 may further include a storage module (e.g., a memory) or a processor (e.g., an application processor (AP)).

Figure 6:
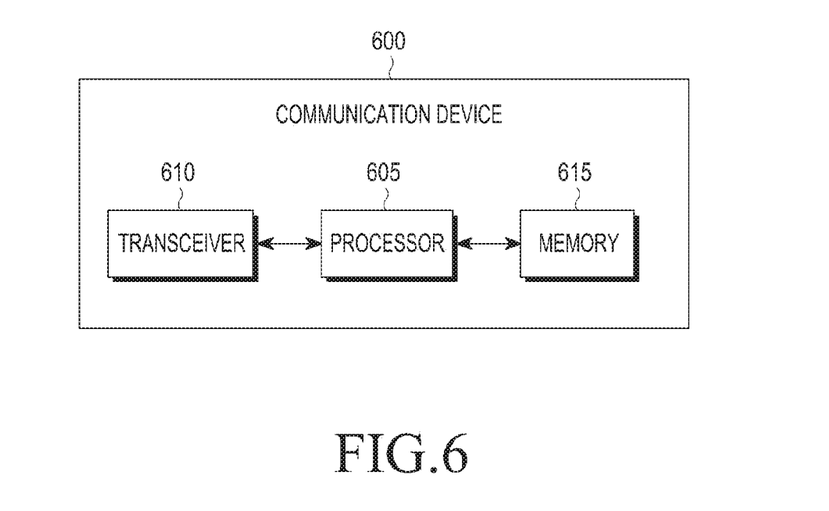
FIG. 6 is a block diagram of a communication device included in a UE according to an aspect of the present disclosure.

FIG. 6 is a block diagram of a communication device included in a UE according to an aspect of the present disclosure.

Referring to FIG. 6, the communication device 600 may include a transceiver 610 and a processor 605. Alternatively, the communication device 600 may further include a memory 615. In an aspect of the present disclosure, the transceiver 610 may be omitted from the communication device 600.

The transceiver 610, for example, may perform communication between the communication device 600 and an external device. For example, the transceiver 610 may be connected to a network through a wireless or wired communication to communicate with the external device. The transceiver 610 may also be referred to as a communication module or a communication interface. Wireless communication may be, for example, cellular communication such as LTE, LTE-A, code division multiple access (CDMA), wideband CDMA (WCDMA), universal mobile telecommunications system (UMTS), wireless broadband (WiBro) or global system for mobile communication (GSM). In addition, wireless communication may include, for example, short range communication such as wireless fidelity (WiFi), Bluetooth, near field communication (NFC) and global navigation satellite system (GNSS).

All operations of the UE or the UE modem described in the present disclosure may be performed under control of the processor 605. However, the processor 605 and the transceiver 610 may not be implemented as separate devices, and may be implemented as one device such as a single integrated circuit or chip. The processor 605 may further include a communication processor (CP). The processor 605 may further include at least one of a central processing unit (CPU) and an AP. For example, the processor 605 may carry out operations or data processing related to control and/or communication of at least one other element of the electronic device 600. The processor may also be referred to as a control module, a control unit, or a controller.

The memory 615 may include a volatile memory and/or a non-volatile memory. The memory 615 may store, for example, commands or data related to at least one other component of the electronic device 600. The memory 615 may store software and/or a program. The program may include, for example, a kernel, a middleware, an application programming interface (API) and/or an application program (or an application), and the like.

It should be noted that the synchronization signal transmission resource, the calculation operation of the UE, the UE operation method, the configuration example of the UE, and the communication device, which are illustrated in FIGS. 1 to 6 are not intended to limit the scope of the present disclosure. That is, it is not intended that all components or operations shown in FIGS. 1 and 6 are essential components for implementing the present disclosure, and it should be understood that only a few components may implement the present disclosure without departing the scope and spirit of the present disclosure.

While the present disclosure has been shown and described with reference to certain aspects thereof, it will be understood by those skilled in the art that various changes in form and details may be made therein without departing from the scope and spirit of the present disclosure. Therefore, the scope of the present disclosure is not intended to be limited to the embodiments, but is defined by the appended claims and equivalents thereof.

What is claimed is:

1. A method of detecting a synchronization signal of a user equipment (UE) in a wireless communication system, the method comprising:
   receiving a synchronization signal, wherein the code sequence includes an even code sequence and an odd code sequence;
   obtaining the code sequence by de-scrambling the received synchronization signal;
   generating and storing a correlation value of the even code sequence by full-correlating the even code sequence with even candidate code sequences, wherein the even candidate code sequences are determined based on a first index among the first index and a second index;
   generating a correlation value of the odd code sequence by full-correlating the odd code sequence with odd candidate code sequences, wherein the odd candidate code sequences are determined based on the first index and the second index,
   obtaining a correlation value of the code sequence by adding the stored correlation value of the even code sequence to the generated correlation value of the odd code sequence; and
   detecting the synchronization signal based on the obtained correlation value of the code sequence,
   wherein the first index and the second index are determined based on a physical cell identity.

2. The method of claim 1, wherein the synchronization signal is a secondary synchronization signal (SSS).

3. The method of claim 2, wherein a number of the even candidate code sequence is equal to the length of the even code sequence.

4. The method of claim 3, wherein the number of odd candidate code sequences is determined based on a number of physical-layer cell identity (ID) groups of the wireless communication system.

5. The method of claim 4, further comprising:
   determining a frame timing based on the synchronization signal.

6. The method of claim 5, wherein detecting the synchronization signal comprises determining the odd candidate code sequence of which the correlation value of the code sequence is the largest as a code sequence of the SSS.

7. The method of claim 6, further comprising expressing the correlation value of the code sequence as a correlation metric for the even code sequence and a correlation metric for the odd code sequence.

8. A chip capable of detecting a synchronization signal in a wireless communication system, the chip comprising:
   a memory;
   a transceiver; and
   a processor, wherein the processor, when executing one or more programs stored in the memory, controls the chip to perform the operations of:

receiving, via the transceiver, a synchronization signal, wherein the code sequence includes an even code sequence and an odd code sequence;

obtaining the code sequence by de-scrambling the received synchronization signal, generating and storing a correlation value by full-correlating the even code sequence with even candidate code sequences, wherein the even candidate code sequences are determined based on a first index among the first index and a second index, generating a correlation value by full-correlating the odd code sequence with odd candidate code sequences, wherein the odd candidate code sequences are determined based on the first index and the second index, obtaining a correlation value of the code sequence by adding the stored correlation value of the even code sequence to the generated correlation value of the odd code sequence, and detecting the synchronization signal based on the obtained correlation value of the code sequence, wherein the first index and the second index are determined based on a physical cell identity.

9. The chip of claim 8, wherein the synchronization signal is a secondary synchronization signal (SSS).

10. The chip of claim 9, wherein a number of the even candidate code sequences is equal to the length of the even code sequence.

11. The chip of claim 10, wherein the number of the odd candidate code sequences is determined based on a number of physical-layer cell identity (ID) groups of the wireless communication system.

12. The chip of claim 11, wherein the processor is further configured to determine a frame timing based on the synchronization signal.

13. The chip of claim 12, wherein the odd candidate code sequence of which the correlation value of the code sequence is the largest is determined as a code sequence of the SSS.

14. The chip of claim 13, wherein the correlation value of the code sequence is expressed as a correlation metric for the even code sequence and a correlation metric for the odd code sequence.

15. A user equipment (UE) capable of detecting a synchronization signal in a wireless communication system, the UE comprising:

a display;

an input/output interface; and a communication device connected to the display and the input/output interface, wherein the communication device is configured to:

receive a synchronization signal, wherein the code sequence includes an even code sequence and an odd code sequence, obtain the code sequence by de-scrambling the received synchronization signal, generate and stores a correlation value by full-correlating the even code sequence with even candidate code sequences, wherein the even candidate code sequences are determined based on a first index among the first index and a second index, generate a correlation value by full-correlating the odd code sequence with odd candidate code sequences, wherein the odd candidate code sequences are determined based on the first index and the second index, obtain a correlation value of the code sequence by adding the stored correlation value of the even code sequence to the generated correlation value of the odd code sequence, and detect the synchronization signal based on the obtained correlation value of the code sequence, wherein the first index and the second index are determined based on a physical cell identity.

16. The UE of claim 15, wherein the synchronization signal is a secondary synchronization signal (SSS).

17. The UE of claim 16, wherein a number of the even candidate code sequences is equal to the length of the even code sequence.

18. The UE of claim 17, wherein the number of the odd candidate code sequences is determined based on a number of physical-layer cell identity (ID) groups of the wireless communication system.

19. The UE of claim 18, wherein the processor is further configured to determine a frame timing based on the synchronization signal.

20. The UE of claim 19, wherein the processor is further configured to determine the odd candidate code sequence of which the correlation value of the code sequence is the largest as a code sequence of the SSS.

* * * * *